US008205255B2

(12) United States Patent
Benea et al.

(10) Patent No.: US 8,205,255 B2
(45) Date of Patent: Jun. 19, 2012

(54) ANTI-CONTENT SPOOFING (ACS)

(75) Inventors: Robert Benea, Santa Clara, CA (US);
Avneet Kaur Puri, Santa Clara, CA
(US); Virgil Mihailovici, Sunnyvale, CA
(US); Ravi Varanasi, Richardson, TX
(US)

(73) Assignee: Cisco Technology, Inc., San Jose, CA (US)

( * ) Notice: Subject to any disclaimer, the term of this patent is extended or adjusted under 35 U.S.C. 154(b) by 1033 days.

(21) Appl. No.: 11/748,314

(22) Filed: May 14, 2007

(65) Prior Publication Data
US 2008/0289047 A1 Nov. 20, 2008

(51) Int. Cl.
G06F 7/04 (2006.01)
(52) U.S. Cl. ............... 726/22; 726/23; 726/24; 726/25; 713/194
(58) Field of Classification Search .................. 713/194; 726/22–25
See application file for complete search history.

(56) References Cited

U.S. PATENT DOCUMENTS

| 6,851,060 | B1 * | 2/2005 | Shrader ............................ 726/10 |
| 7,043,473 | B1 * | 5/2006 | Rassool et al. ......................... 1/1 |
| 7,107,619 | B2 * | 9/2006 | Silverman ........................ 726/27 |
| 7,171,589 | B1 * | 1/2007 | Urmanov et al. ............... 714/47 |
| 7,617,231 | B2 * | 11/2009 | Moon et al. ............................ 1/1 |
| 2003/0084321 | A1 * | 5/2003 | Tarquini et al. ............... 713/200 |
| 2003/0145232 | A1 * | 7/2003 | Poletto et al. ................. 713/201 |
| 2005/0060643 | A1 * | 3/2005 | Glass et al. ................. 715/501.1 |
| 2006/0070123 | A1 | 3/2006 | Camilli et al. |
| 2006/0155739 | A1 * | 7/2006 | Broder et al. .................. 707/102 |
| 2007/0039038 | A1 * | 2/2007 | Goodman et al. ................ 726/2 |
| 2007/0214151 | A1 * | 9/2007 | Thomas et al. .................. 707/10 |
| 2008/0235163 | A1 * | 9/2008 | Balasubramanian et al. .. 706/12 |
| 2008/0256187 | A1 * | 10/2008 | Kay ............................. 709/206 |
| 2008/0263026 | A1 * | 10/2008 | Sasturkar et al. ................. 707/5 |
| 2008/0288509 | A1 * | 11/2008 | Mysen et al. .................. 707/100 |
| 2009/0028441 | A1 * | 1/2009 | Milo et al. ..................... 382/218 |
| 2009/0282476 | A1 * | 11/2009 | Nachenberg et al. ........... 726/22 |

FOREIGN PATENT DOCUMENTS
EP   1681825 A1   7/2006
(Continued)

OTHER PUBLICATIONS

Hintz, A. "Fingerprinting Websites Using Traffic Analysis", Lecture Notes in Computer Science, Proceedings of the 2nd International Conference on Privacy Enhancing Technologies, San Francisco, CA, USA, pp. 171-178, 2002, Springer-Verlag Berlin, Heidelberg. The University of Texas at Austin, http://guh.nu.*

(Continued)

*Primary Examiner* — Kambiz Zand
*Assistant Examiner* — Tongoc Tran
(74) *Attorney, Agent, or Firm* — Schwegman, Lundberg & Woessner, P.A.

(57) ABSTRACT

A system to prevent content spoofing by detecting phishing attacks is provided. The system checks each webpage visited by a user and determines if the page is legitimate. To determine if a page is legitimate, the system employs fingerprints to check how similar the browsed page is with respect to an original page. If the similarity between browsed page and the original page is found to be more than a preset threshold, then the browsed page is considered to be a spoofed page. Access to the spoofed page is then either denied and/or an alarm is triggered.

20 Claims, 9 Drawing Sheets

FOREIGN PATENT DOCUMENTS

WO  WO-2009023315 A2  2/2009

OTHER PUBLICATIONS

Greenfield et al., "Access Prevention Techniques for Internet Content Filtering", CSIRO, Dec. 21, 1999, pp. 1-79.*

Tally et al., "Anti-Phishing: Best Practices for Institutions and Consumers", McAfee Research Technical Report #04-004, Sep. 2004.*

Wu, Min, "Thesis Proposal: Fighting Phishing at the User Interface", PhD Thesis Proposal, Dec. 2004.*

Michael O. Rabin. "Fingerprinting by Random Polynomials". Center for Research in Computing Technology, Harvard University. TR-15-81. Last accessed Sep. 25, 2007.

Udi Manber. "Finding Similar Files in a Large File System". TE-93-33. Oct. 1993.

Sumeet Singh, Cristian Estan, George Varghese and Stefan Savage. "Automated Worm Fingerprinting". Department of Computer Science and Engineering, University of California, San Diego. http://www.cs.ucsd.edu/~savage/papers/OSD104.pdf.

"International Application No. PCT/US2008/3633868, Search Report and Written Opinion mailed Feb. 18, 2009", 11 pgs.

Fu, A. Y., et al., "Detecting Phishing Web Pages with Visual Similarity Assessment Based on Earth Mover's Distance (EMD)", IEEE Transactions on Dependable and Secure Computing, 3, (Oct. 1, 2006), 301-311.

Liu, W., et al., "An Antiphishing Strategy Based on Visual Similarity Assessment", IEEE Internet Computing, 10, (Mar. 1, 2006), 58-65.

* cited by examiner

ANTI-CONTENT SPOOFING (ACS)

TECHNICAL FIELD

The subject disclosure relates generally to content spoofing and in particular to a system and methodology to avoid phishing attacks by employing fingerprinting techniques.

BACKGROUND

The Internet represents enormous potential for commercial opportunity. The Internet is widely used in various aspects and has grown to a point where a large portion of the commerce of the world is transacted online. Unfortunately, with the growth in use and acceptance of the Internet, Internet based crime rate has also increased. Incidents resulting from the lack of effective security on the Internet are rapidly growing in number.

Content spoofing is a common attack technique employed to trick a user into believing that content appearing on a website is legitimate and not from an external source. A hacker or other malicious agent can present a fake or modified website to the user as if it were legitimate. The intent is, typically, to defraud victims although sometimes the purpose is simply to misrepresent an organization or an individual. Content spoofing can result in exploiting an established trust relationship between a computer user and an organization.

An Internet user can be easily lured to view spoofed content by links posted in e-mails, bulletin-board postings and/or chat-room transmissions. These spoofing attempts can be foiled if a user is trained to recognize spoofed content and refrains from clicking links in such postings. However, in some cases, a hacker may modify the information and the links in an established website by altering the content on the server of a legitimate concern. This mode of content spoofing is more difficult to detect because the casual Internet user cannot tell whether the page is legitimate or not.

Phishing attacks are a type of content spoofing technique wherein a hacker attempts to fraudulently acquire sensitive information related to the user, such as usernames, passwords and credit card details, by masquerading as a trustworthy entity in an electronic communication. Phishing can have a huge negative impact on organizations' revenues, customer relationships, marketing efforts and overall corporate image. The damage caused by phishing ranges from loss of access to email to substantial financial loss. Phishing attacks can cost companies huge amounts in fraud related losses as well as personnel time.

Traditional approaches to avoid these attacks include managing a list of content spoofed sites and verifying that the URL (Uniform Resource Locator) request does not belong to this list. However, with this approach, it is required to update the list continuously whenever a new spoofed site is detected.

Another approach to prevent phishing attacks employs Security skins. Security skin is a technique that involves overlaying a user-selected image across a login form as a visual cue to indicate that the form is legitimate. However, this approach requires changes to be made to the web front-end to accommodate new security paradigms and is a cumbersome and tedious process.

Conventional browser level plug-ins can be employed to avoid phishing attacks but these cannot detect the attacks instantly and there is always a period of time between the time a spoof is detected and the time the system can begin detecting attacks. Thus, the conventional approaches employed to foil phishing attacks can be cumbersome and unreliable.

DESCRIPTION

Overview

Figure 1:
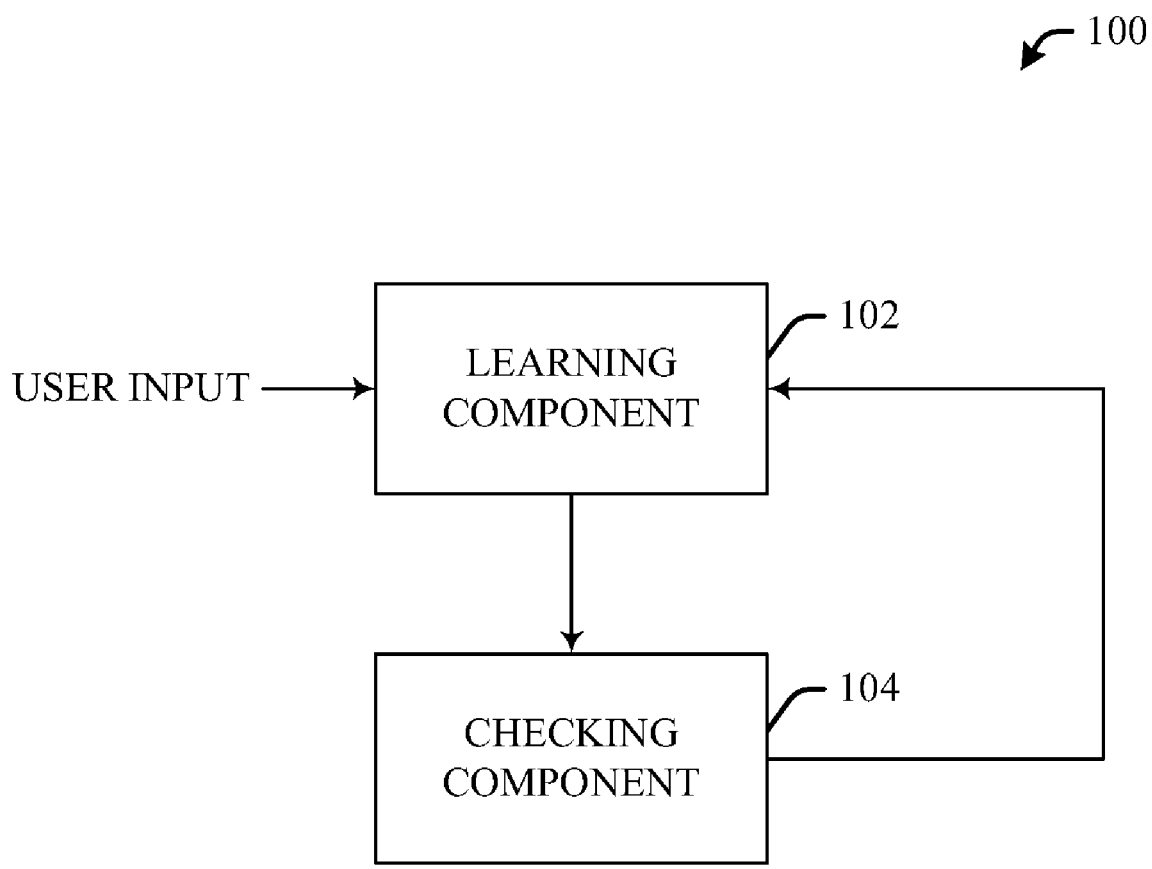
FIG. 1 illustrates a block diagram of an example system that detects content spoofing.

The following presents a simplified overview of the claimed subject matter in order to provide a basic understanding of some embodiments described herein. This is not an extensive overview of the claimed subject matter. It is intended to neither identify key or critical elements of the claimed subject matter nor to delineate the scope of that subject matter. Its sole purpose is to present some concepts of the claimed subject matter in a simplified form as a prelude to the more detailed description of example embodiments that is presented later.

The system disclosed and claimed herein, in one aspect thereof, prevents content spoofing by detecting phishing attacks. The system checks each page visited by a user and determines if the page is legitimate, in accordance with one aspect of the invention. To determine if a browsed page is legitimate, the system checks how similar the browsed page is with respect to an original page. If the similarity between the browsed page and the original page is found to be more than a threshold, and the name or IP (Internet Protocol) address is not the same, then the browsed page is considered to be a spoofed page.

According to an aspect of the system, a learning component is employed to prepare a pre-learned database of common websites and store their fingerprints, URLs (Uniform Resource Locator) and IP (Internet Protocol) addresses in a database. Thereafter, the fingerprints stored in the database are compared to the fingerprints of browsed websites to determine if a browsed website is legitimate.

The leaning component comprises a traffic analyzing component that dynamically determines the pages to be recorded and fingerprinted, in accordance with one aspect of the system. The traffic analyzing component includes a list of websites/services that are either input by a user or are automatically determined. The automatic determination of selecting a particular website to be included in the list is based on a risk factor calculated for that website.

According to another aspect of the system, a fingerprint extracting component is employed to generate a fingerprint of a website, determined by the traffic analyzing component, by employing a fingerprint extracting algorithm. The fingerprint of the website along with its URL (Uniform Resource Locator) and IP address is stored in a database.

One aspect of the system relates to a checking component that determines if a webpage browsed by a user is legitimate based upon its similarity with a query page stored in a database. If the similarity between the browsed page and the query page is greater than a defined threshold and the name or IP address is different, then the browsed page is denied and/or an alarm is triggered to indicate to the user that the webpage that the user is trying to access is spoofed. The checking component monitors the websites browsed by a user employing a monitoring component, in accordance with an aspect of the system. The checking component further comprises a fingerprint computing component that dynamically generates fingerprints of the browsed pages which are then compared, by a comparison component, to the fingerprints of the query pages stored in the database. The comparison component determines if the browsed webpage is legitimate based on the similarity between the fingerprints of the browsed page and the query page, and the names or IP addresses of the pages.

Yet another aspect of the system relates to an output component that triggers an alarm once a spoofed page is detected. The user is alerted with an audio alert and/or a visual display, indicating that the browsed page is a spoof. The user is denied access to a spoofed page, in accordance with one aspect of the system.

The following description and the annexed drawings set forth in detail certain illustrative embodiments of the claimed subject matter. These embodiments may be indicative, however, of but a few of the various ways in which the principles of the claimed subject matter may be employed and the claimed subject matter is intended to include many and/or all such embodiments and their equivalents. Other advantages and novel features of the claimed subject matter will become apparent from the following description of example embodiments when considered in conjunction with the drawings.

DESCRIPTION OF EXAMPLE EMBODIMENTS

The specification is now described with reference to the drawings, wherein like reference numerals are used to refer to like elements throughout. In the following description, for purposes of explanation, numerous specific details are set forth in order to provide a thorough understanding of the subject specification. It may be evident, however, that the specification can be practiced without these specific details. In other instances, well-known structures and devices are shown in block diagram form in order to facilitate describing the specification.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Furthermore, the terms "web page," and "website," are generally used interchangeably herein and relate to a resource of information that can be suitable for the World Wide Web and can be accessed through a web browser.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates an anti-content spoofing system 100 that can be employed to prevent content spoofing by detecting phishing and/or pharming attacks. The system can avoid such attacks by learning a set of legitimate websites that a user would want to protect, either dynamically or statically, and verifying whether a new URL (Uniform Resource Locator) response is similar to a learnt website. A spoofed page is determined by comparing addresses, such as the IP (Internet Protocol) address of the browsed website and the legitimate website.

Typically, the anti-content spoofing system 100 can include a learning component 102 that can be employed to dynamically and/or statically determine a set of services that a user subscribes to and would like to protect. For example, a user may want to protect a website relating to online banking or a website that accesses sensitive information such as credit card details, passwords or usernames. Furthermore, a user can manually specify a list of websites that the user wishes to protect via a user input. Additionally, the system can monitor the websites browsed by the user and dynamically create, update and/or modify this list.

The list of legitimate websites can then be recorded and fingerprinted by the learning component 102. Furthermore, other criteria associated with the websites, such as the IP address and the URL can also be stored along with the fingerprint of the website. The learning component 102 can be employed to populate a database (not shown) that stores a collection of legitimate websites along with the information associated with them.

The system 100 can also include a checking component 104 that can be employed to check if a browsed website is legitimate or not. The checking component 104 can automatically compute fingerprints of all the websites browsed by a user and check the fingerprint of each browsed website against the set of fingerprints of legitimate websites stored by the learning component 102. The fingerprints can be compared and if the fingerprint of the browsed website is found to be similar to a stored fingerprint, then the name and/or IP address of both the sites are compared. Based on this comparison, the legitimacy of each of the browsed websites is verified.

The checking component 104 can further generate feedback information regarding spoofed web pages that can be employed by the learning component 102. As an example, if the checking component 104 determines that a browsed webpage is spoofed, it can feedback this information to the learning component 102 that can employ this information to record a particular web page as spoofed.

Figure 2:
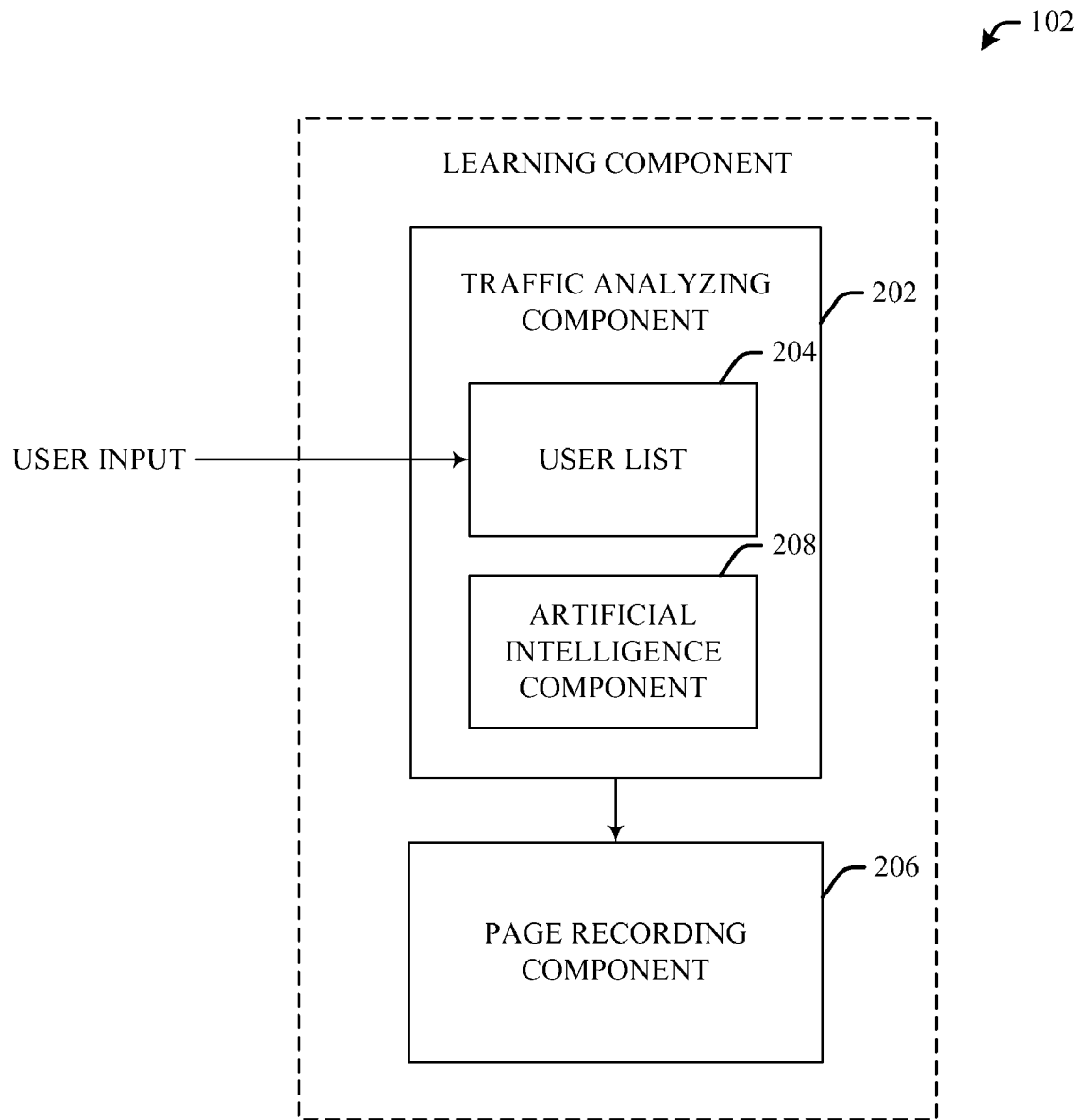
FIG. 2 illustrates a block diagram of an example system that selects web pages to be protected and stores information associated with the elected webpage in accordance with an aspect of the system.

Referring now to FIG. 2, there is illustrated a learning component 102 in accordance with an aspect of the system. The learning component 102 can be employed to record a set of web pages that can be protected. The determination of pages that are to be recoded can be done dynamically and/or statically via a traffic analyzing component 202.

The traffic analyzing component 202 can dynamically determine a set of web pages to be recorded by monitoring the pages browsed by a user and scanning the URL for factors such as fields of type password, presence of forms or keywords such as 'password', 'SSN', 'account number', 'submit', 'username', etc. The traffic analyzing component 202 can then calculate a risk factor, as a function of the above mentioned factors, based upon which, the page can be recorded.

Most often, phishing attacks are created by sending links embedded in emails, instant messaging sessions or web forums wherein the links appear to come from companies and agencies with which the user may regularly conduct business. Typically, such emails, instant messaging sessions or web forums contain links to sites that look remarkably like a legitimate organization's site. As an example, an email message may lure a user to disclose sensitive information by threatening a consequence such as closing an account or terminating a service unless the user updates billing information via the link provided. Thus, such attacks can be avoided by monitoring services employed by a user and dynamically recording web pages that include these services.

Referring back to FIG. 2, the user can provide a user input and explicitly list a set of web pages that the user wants to protect. The list of user specified web pages can be stored as user lists 204 and can be sent to a page recording component 206 along with the list of web pages dynamically determined by the traffic analyzing component 202.

The traffic analyzing component 202 can further employ an artificial intelligence (AI) component 208 which facilitates automating one or more features in accordance with the subject specification. The subject specification (e.g., in connection with selection of web pages) can employ various AI-based schemes for carrying out various aspects thereof. For example, a process for determining a risk factor and selecting the websites that are recorded by the page recording component 206 can be facilitated via an automatic classifier system and process. Moreover, a classifier can be employed to determine which website will be selected and stored.

A classifier is a function that maps an input attribute vector, $x=(x1, x2, x3, x4, xn)$, to a confidence that the input belongs to a class, that is, $f(x)=\text{confidence}(\text{class})$. Such classification can employ a probabilistic and/or statistical-based analysis to prognose or infer an action that a user desires to be automatically performed. In the case of selection of web pages, for example, attributes can be keywords such as password, SSN, account number, username, submit etc. or other data-specific attributes derived from the keywords, and the classes can be categories or areas of interest (e.g., websites relating to financial information).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject specification can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining, according to a determined criteria, which websites browsed should be recorded. The criteria can include, but is not limited to, the amount of sensitive and/or personal information that can be submitted on the website.

Referring back to FIG. 2, the learning component 102 can generally include the page recording component 206 that can be employed to extract and record the fingerprints of the set of web pages provided by the traffic analyzing component 202. The page recording component 206 can also store a name and/or address associated with each of the recorded web pages along with the fingerprint of each page.

Figure 3:
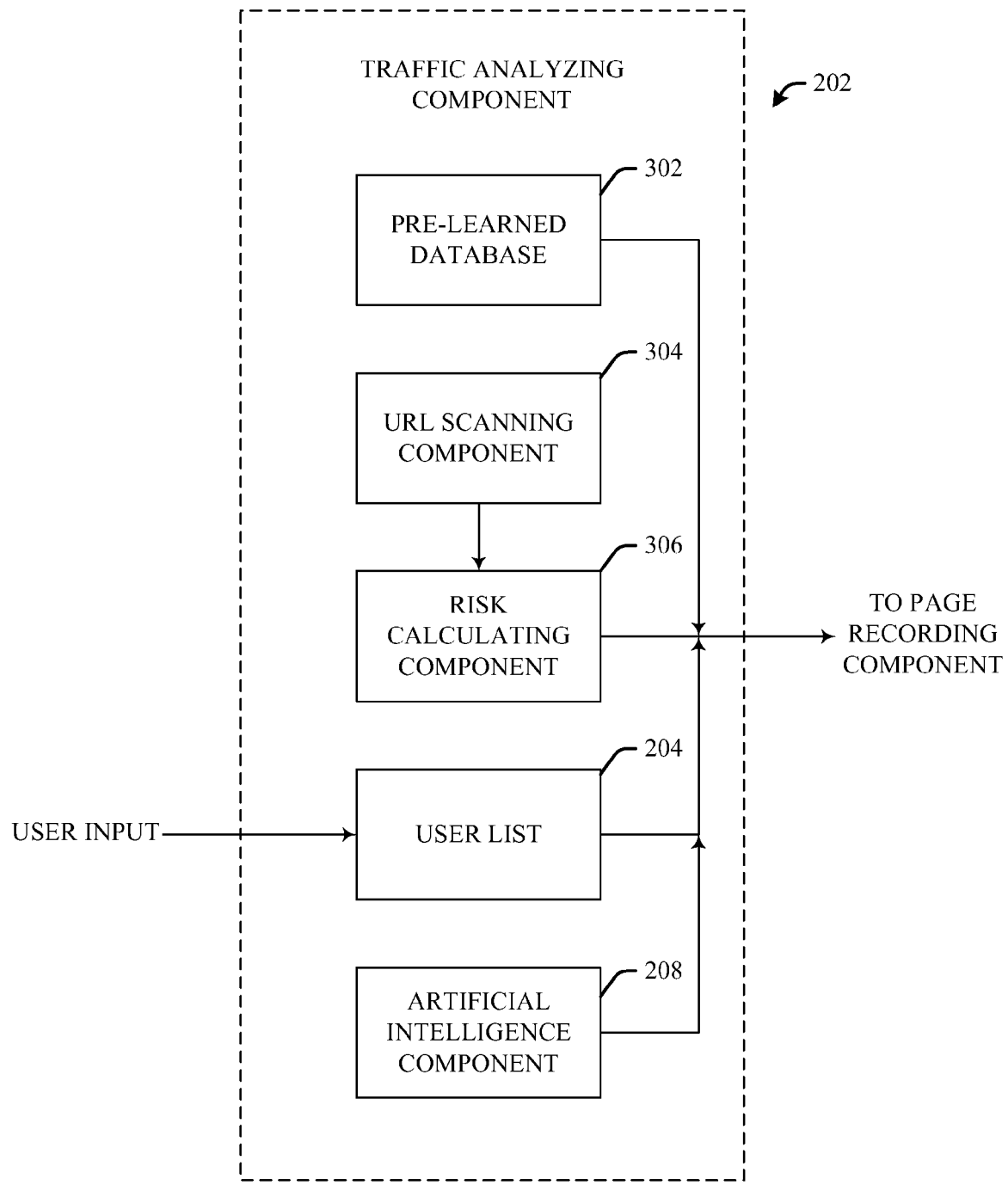
FIG. 3 illustrates a block diagram of an example system that generates a list of websites which are to be protected against spoofing attacks according to an aspect of the specification.

FIG. 3 illustrates an example traffic analyzing component 202 that can dynamically or statically determine a set of web pages that can be recorded. The traffic analyzing component 202 can monitor the web pages browsed by a user and compute a risk factor associated with the browsed page to dynamically determine a list of web pages that can be recorded.

Generally, the traffic analyzing component 202 can include a pre-learned database 302 of common web pages that are employed by most users. As an example, the pre-learned database can include a set of web pages such as www.xyz.com. A list of such pages can be sent to the page recording component 206 (FIG. 2) such that the fingerprint and URL and/or IP address can be stored.

A URL scanning component 304 can be employed to scan various factors relating to a user's personal information on a browsed page to determine if the browed page should be recorded. By way of example, in order to efficiently utilize resources, only a set of web pages browed by the user are fingerprinted and stored. The selection of web pages to be stored can be based upon a risk determining factor. The URL scanning component 304 can scan a URL for factors associated with a user's personal information such as, but not limited to, fields of type password (e.g. INPUT TYPE=PASSWORD NAME="mypassword"), presence of forms and/or keywords (e.g. password, SSN, account number, credit card, drivers license, username, login, submit).

A risk calculating component 306 can then be employed to calculate a risk factor by weighing the factors scanned by the URL scanning component 304. The risk factor for a browsed web page can be compared with a preset or inferred threshold to determine if the page should be stored. If the risk factor associated with a particular browsed webpage is greater than the defined threshold, the webpage is added to a list of browsed web pages that can be recorded by the page recording component 206 (FIG. 2).

The traffic analyzing component 202 can further include a user list 204 that can store a list of web pages defined by a user via a user input. The user can specify a set of web pages that the user wishes to protect and add them to a user list 204. Typically, such a set can include a list of web pages related to services employed by the user. As an example, these could include the user's bank website or a website for a credit card held by the user.

Thus, the traffic analyzing component 202 can be employed to determine a list of web pages that can be recorded based on a user specified list, a pre-learned database or a list determined by analyzing web pages browsed by a user. The traffic analyzing component 202 can also include the artificial intelligence component 208 to automatically determine a list of web pages to be recorded.

Figure 4:
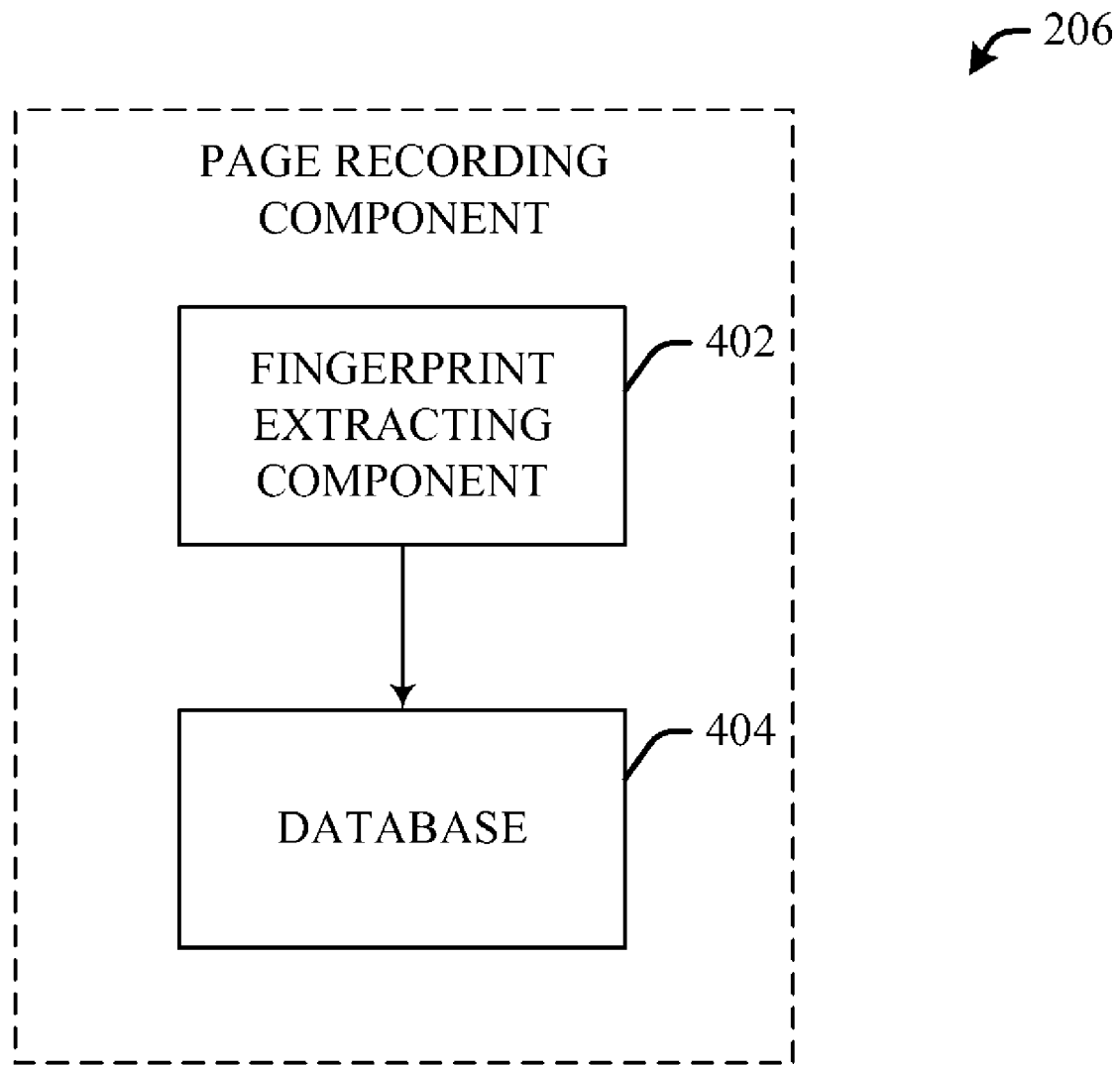
FIG. 4 illustrates an example system that computes a fingerprint of a web page and stores it in a database in accordance with an aspect of the specification.

FIG. 4 illustrates an example page recording component 206. The list of web pages obtained from the traffic analyzing component 202 can be recorded and their fingerprints can be stored as query fingerprints.

Most often, the page recording component 206 includes a fingerprint extracting component 402 that can be employed to compute the fingerprint of a browsed web page that is to be recorded. Fingerprints can be computed by employing various algorithms such that the fingerprints generated are meaningful and at the same time fast to compute. As an example, considering a text $t_1 t_2 t_3 \ldots t_n$ where $t_i$ is a byte, the fingerprint for the first 50 bytes can be determined as:

$$F_1 = \sum_{i=1}^{50} t_i \cdot p^{50-i} \cdot \mod(M)$$

The next 50 bytes starting with $t_2$ can be determined as, $F_2=(p.F_1+t_{51}-t_1.p^{50}).\mod\ (M)$, $F_3=(p.F_2+t_{51}-t_1.p^{50}).\mod\ (M)$ ... Where p is a prime number; M is a large enough number (e.g. $2^{30}$). Hence, computing the fingerprints can be proportional to the number of characters not to the size of fingerprints. Similarly, the system can employ only a sample of all the possible fingerprints. For instance, the system can employ the fingerprints that have last 5 bits 0, which will result in $\frac{1}{2}^5$ fingerprints. To calculate fingerprints even faster, the system can employ a method that can pre-compute the value of $tx.p^{50}$ for all possible characters.

The fingerprint extracting component 402 can also employ randomly chosen irreducible polynomials to fingerprint text. If a prime number p is employed, as shown in the example above, it can be possible for a hacker to create a spoof page such that the algorithm is eluded. To avoid such a problem, the algorithm can employ a Rabin fingerprinting technique by random polynomial wherein the number of irreducible polynomials of degree k is $2^k/k$, so the probability that one will choose the same irreducible polynomial is $k/2^k$.

The fingerprint extracting component 402 can further include a feature to avoid duplicate signatures. The algorithm can be employed to just count the first occurrence of a signature and ignore all the duplicates. With this approach, most of the noisy information can be discarded.

Once the selected web pages are fingerprinted by employing a fingerprinting algorithm such as, but not limited to, those described above, the query fingerprints along with information associated with the selected web page can be stored in a database 404. The information associated with the selected web page can include, but is not limited to, the URL and/or the IP address of the page. Although database 402 is shown inclusive of page recording component 206, it is to be understood that database 402 can be remotely located or distributed throughout multiple locations without departing from the scope of this disclosure and claims appended hereto.

The database 404 employed to store fingerprints can be a fast lookup data structure (e.g. hash, trees, tries), for example, a Red-Black (RB) tree structure wherein the time complexity is O(log(n)) can be employed. RB-trees can accurately measure the match percentage for a certain domain. The percentage can be calculated by dividing the number of matched fingerprints to the total number of fingerprints for the specific matched page.

Another approach for the database could employ a bloom filter structure. The query fingerprints can be stored in a bloom filter like structure and the browsed page fingerprints (checked by the checking component 104 in FIG.1) can be compared against the filter. The system can employ a counting bloom filter so that the delete operation can be easily performed. This data structure is space and time efficient. Based upon the number of fingerprints that match the learned ones, the system can decide whether to deny the traffic.

Figure 5:
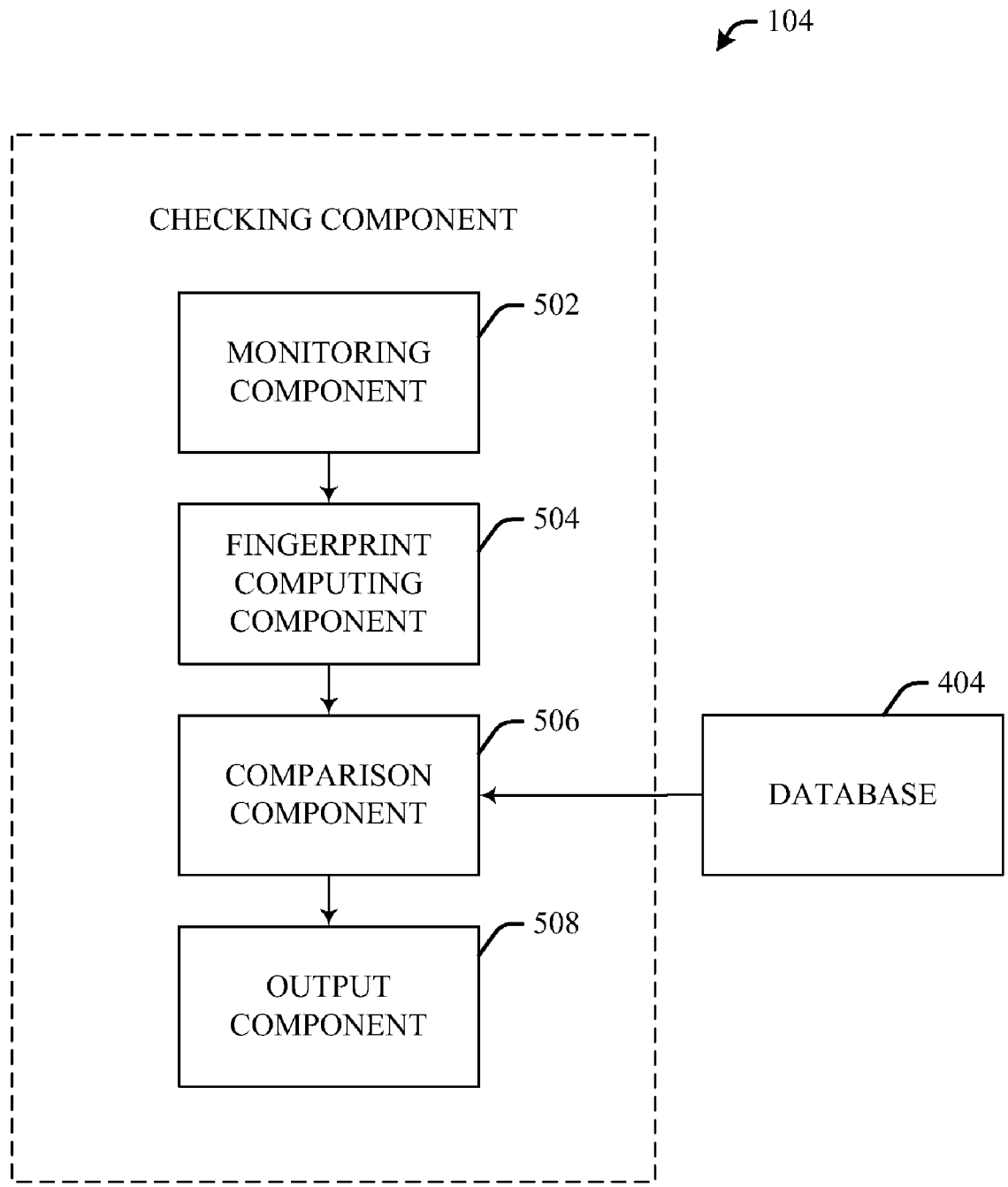
FIG. 5 illustrates an example system that determines if the web page browsed by a user is spoofed in accordance with an aspect of the specification.

Referring now to FIG. 5, there is illustrated an example checking component 104 in accordance with an aspect of the specification. The checking component 104 checks the web pages browsed by a user and compares the fingerprints of each page against the database 404 of query pages to determine if the browsed page is legitimate or not.

A monitoring component 502 can be employed to monitor web pages browsed by the user. Each web page can be fingerprinted by employing a fingerprint computing component 504. The fingerprint computing component 504 can employ the same algorithm for computing the fingerprint of the browsed web page as used by the fingerprint extracting component 402 (FIG. 4) described supra. Furthermore, according to one aspect, the system can employ the same component for computing fingerprint of query pages and browsed pages to efficiently utilize resources.

A comparison component 506 can be employed to compare the fingerprint of the browsed web page, obtained from the fingerprint computing component 504, to the fingerprints of the query pages obtained from database 404. The comparison component 506 determines if the similarity between the browsed page and any of the query pages is greater than a threshold. The threshold can be pre-determined or can be dynamically inferred based on factors such as, but not limited to, type of data, size, user preferences etc. If the pages are found to be similar such that the similarity is greater than the defined threshold, then the name or IP addresses of the pages are compared. The name and/or IP address of the query page is obtained from the database 404. If the name and/or IP address of the two pages is found to differ, the comparison component 506 determines that the page is spoofed and indicates that to the user via an output component 508.

The output component 508 can be employed to trigger an alarm when a spoofed page is detected. The alarm can be in most any form of a visual display such as a warning sign and/or an audio signal such as a beep. Furthermore, the output component can also be employed to restrict access to the spoofed page and provide feedback to the learning component 102 (FIG. 1) regarding the detection of the spoofed page.

Figure 6:
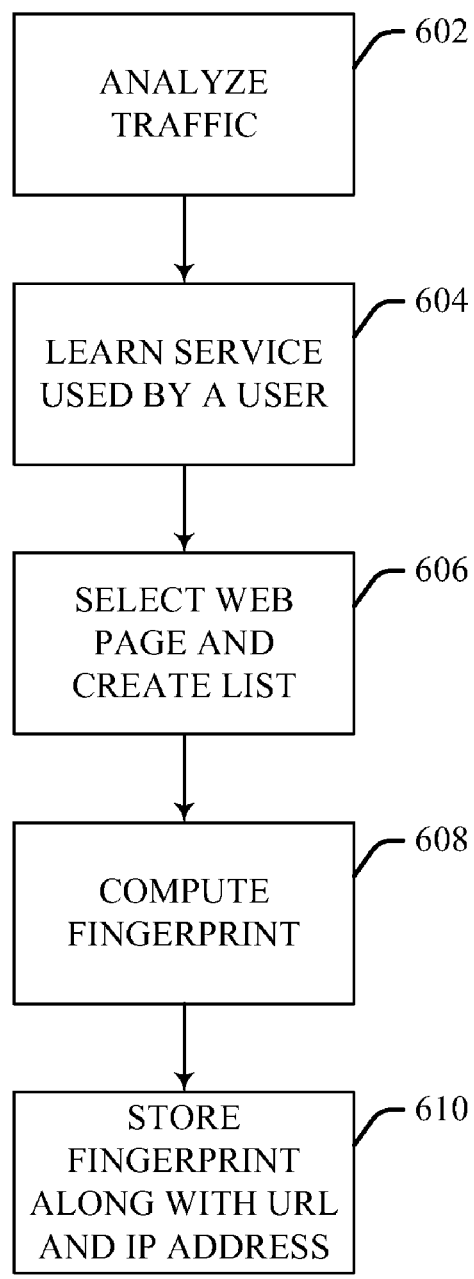
FIG. 6 illustrates an example flow chart of procedures that facilitate recording fingerprints of selected web pages that can be protected against spoofing attacks according to one aspect of the specification.

FIG. 6 illustrates a methodology 600 of selecting a set of web pages and recording them in accordance with an aspect of the specification. While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

Referring now to FIG. 6, web pages browsed by a user can be monitored and the traffic can be analyzed at 602. Through analyzing the traffic, the services used by a user can be determined at 604. These can include, but are not limited to, web pages that are frequently browsed by the user that access sensitive information related to the user, for example, credit card numbers, identification numbers etc. The services used by a user can also be determined by a user input, wherein the user can specify the web pages that he/she would like to protect.

Once a list of web pages to be protected is determined (dynamically and/or statically) at 606, the fingerprint of each of the selected pages is computed at 608. The fingerprint can be computed by employing most any fingerprinting algorithm. The fingerprint of the selected page is then stored along with the URL and IP address associated with the selected page at 610.

Figure 7B:
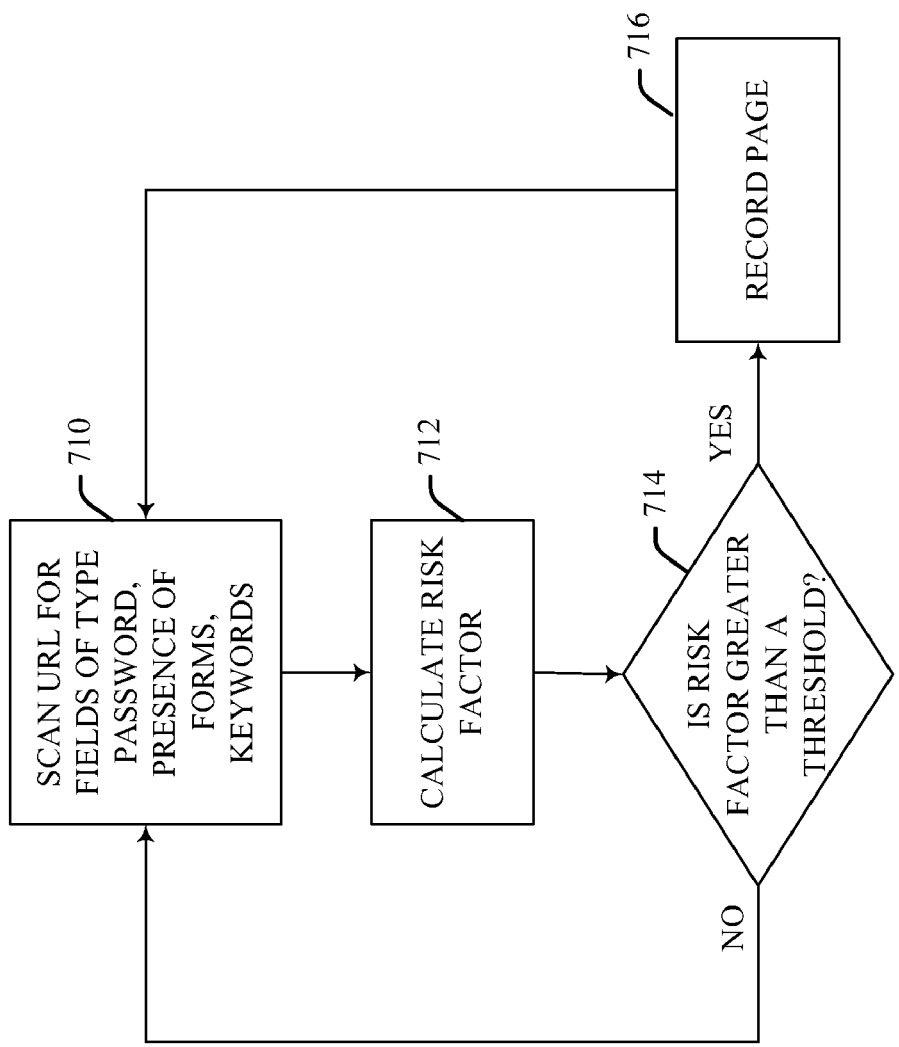
FIG. 7A and FIG. 7B illustrate example flow charts of procedures that facilitate dynamic selection of a web page to be recorded in accordance with aspects of the specification.
Figure 7A:
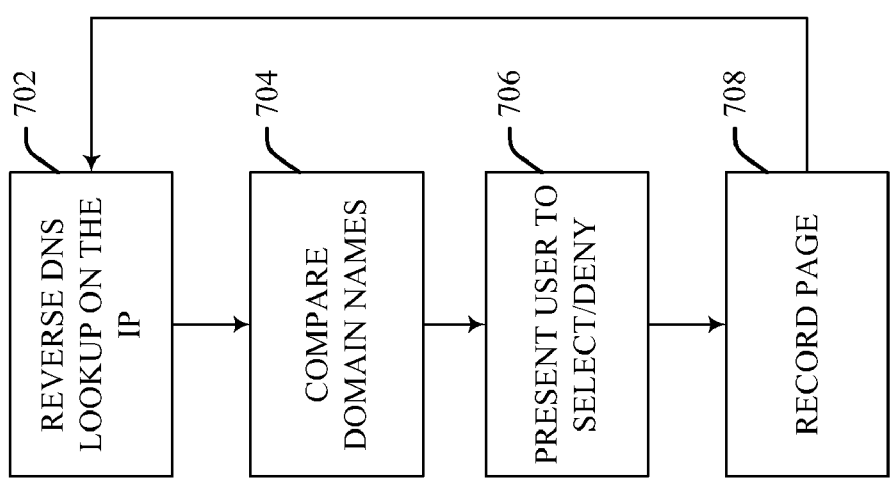

FIGS. 7A and 7B illustrate methodologies for dynamic selection of a web page to be recorded in accordance with the specification. Referring to FIG. 7A, a reverse DNS (domain name service) lookup on the IP address of a website can be performed at 702. The domain name on a link can be compared to the domain name returned by the DNS lookup at 704. Based on the comparison a user can be presented with an option to either select or deny the website at 706 by employing a popup from a security agent and/or a browser. Based on the user response the website can be recorded at 708.

Now referring to FIG. 7B, there is illustrated a methodology to record a web page based on a risk factor associated with the website. The URL of the webpage can be scanned to detect factors such as fields, keywords or presence of forms at 710. The fields can include, but are not limited to, fields of type password. As an example, keywords and include words or phrases such as "pin number", "User-id", "SSN", etc. The forms can include any form that is employed to access user-sensitive information.

A risk factor can then be calculated by weighting the detected factors at 712. The risk factor can be compared to a preset or inferred threshold at 714 to determine if the preset or inferred threshold has been reached. If the risk factor associated with a website is found to be greater than the preset or inferred threshold, then the website is recorded as shown at 716.

Figure 8:
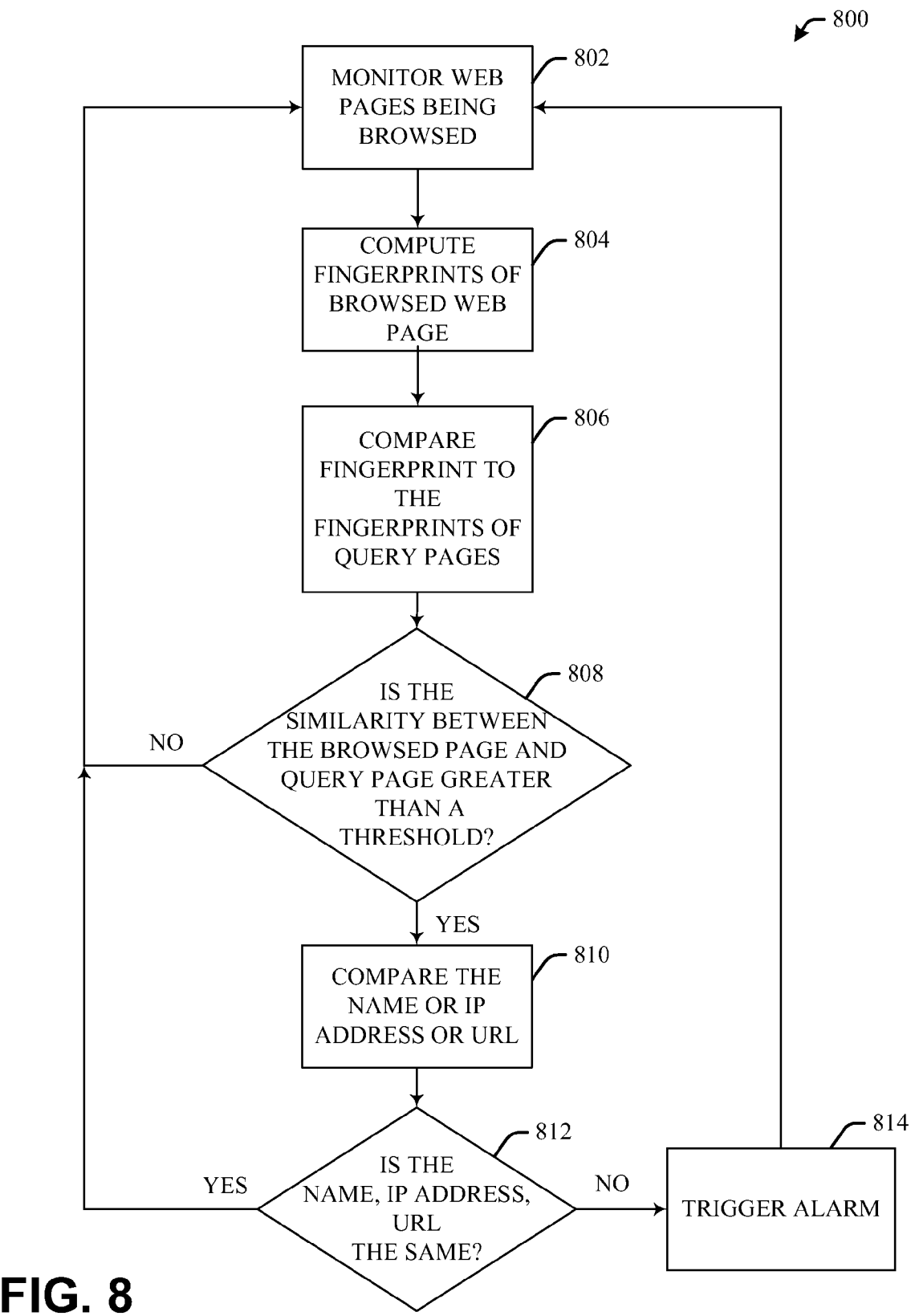
FIG. 8 illustrates an example flow chart of procedures that facilitate checking of web pages browsed by a user in order to detect a spoofed page in accordance with an aspect of the specification.

FIG. 8 illustrates a methodology for checking web pages browsed by a user in order to detect a spoofed page in accordance with the specification. The pages browsed by a user can be monitored at 802. A fingerprint can be computed for each browsed web page at 804 employing most any fingerprinting algorithm. The fingerprint of the browsed web page can then be compared to fingerprints of one or more query pages at 806. Furthermore, it can then be determined if the similarity between the browsed page and the query page is greater than a threshold, as shown by the decision box 808. If the similarity between the browsed page and a query page is greater than the threshold, then the name and/or IP address of the pages can be compared at 810. As shown by the decision box 812, it can be determined if the name and/or IP address of both pages is the same. If the pages have different IP addresses or names, an alarm can be triggered at 814 indicating that the browsed web page is spoofed.

Figure 9:
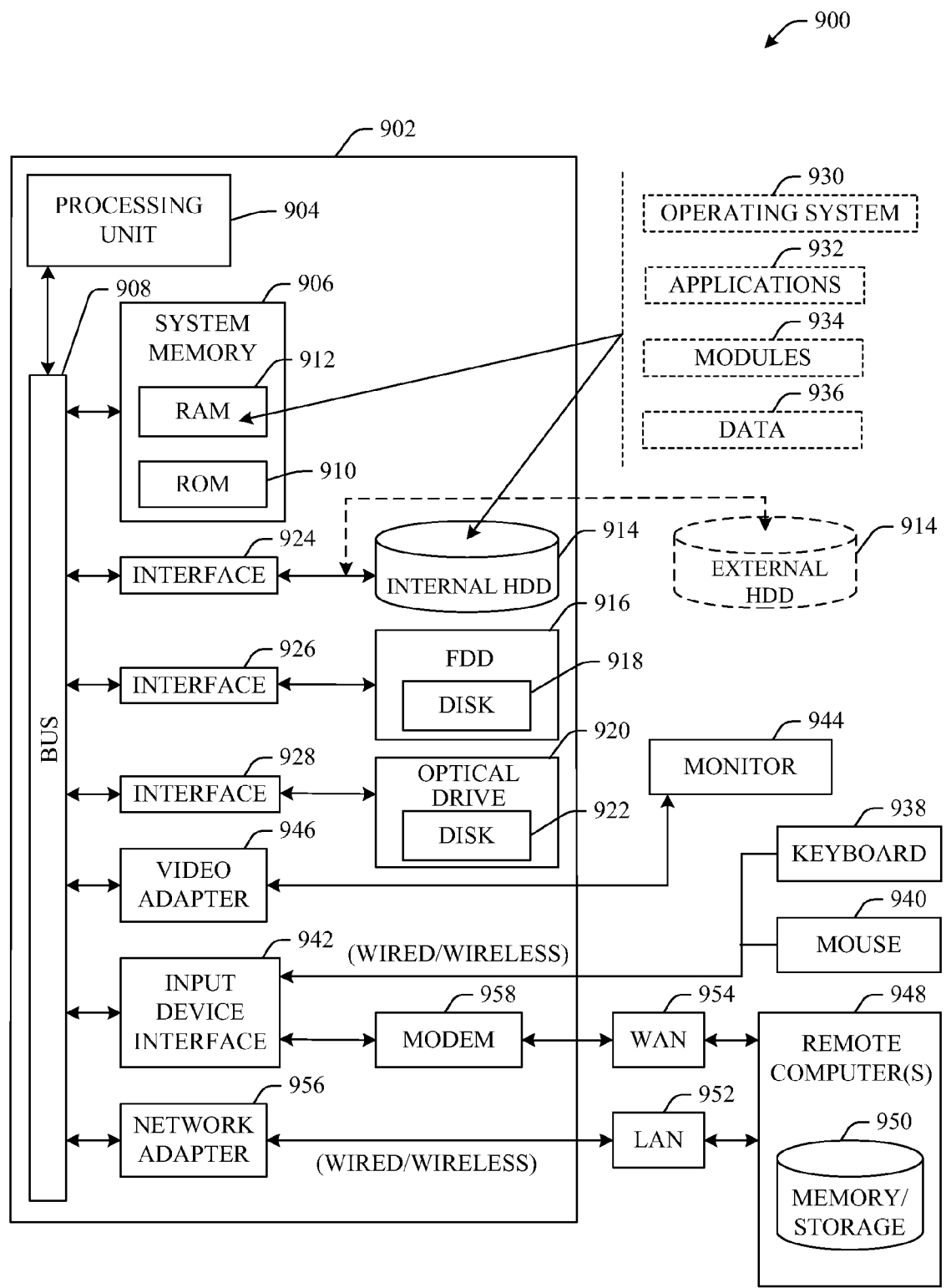
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject specification, FIG. 9 and the following discussion are intended to provide a brief, general description of a suitable computing environment 900 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the example environment 900 for implementing various aspects of the specification includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11 a) or 54 Mbps (802.11b) data rate, for example, or with products that contain both bands (dual band), so the networks can provide real-world performance similar to the basic 10 BaseT wired Ethernet networks used in many offices.

The system can be an embedded software module that resides on a perimeter dedicated hardware platform. As an example, the module can reside on a perimeter firewall such that it is easier to administrate and does not employ PC processing power to compute the fingerprints. Alternatively, the module can reside on a Security Agent plug-in or a Web Browser plug-in such that dynamic learning can be achieved for each user.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An anti-content spoofing system, comprising:
a learning component that determines a list of one or more web pages to be recorded and records information associated with the one or more web pages, the list of one or more web pages specified by a user as legitimate web pages to be protected and selected based on a frequency of the user accessing sensitive information related to the user from the one or more web pages; and
a checking component that compares a browsed webpage to the one or more recorded web pages and determines if the browsed webpage is a spoof based on the comparison of information associated with the web pages, the information includes at least a fingerprint of the web pages, the fingerprint of the browsed web page computed based on a content of the browsed web page.

2. The system of claim 1, further comprising:
a traffic analyzing component that selects the one or more web pages to be recorded from traffic across a network; and
a page recording component that records the information associated with the selected one or more web pages.

3. The system of claim 2, further comprising:
a fingerprint extracting component that determines the fingerprint of the selected one or more web pages; and
a database that stores the fingerprint along with information associated with each of the selected one or more web pages.

4. The system of claim 3, wherein the information associated with the selected one or more web pages includes at least one of a URL (Uniform Resource Locator), name, or IP (Internet protocol) address.

5. The system of claim 2, wherein the one or more web pages are selected based on at least one of a pre-learned database, a user input or dynamic analysis of the traffic.

6. The system of claim 5, further comprising:
a URL (Uniform Resource Locator) scanning component that scans a URL of each of the selected one or more web pages to determine factors relating to a user's personal information; and
a risk calculating component that calculates a risk factor based at least in part on the factors scanned, the risk factor is compared to a threshold to determine if the information associated with the selected one or more web pages should be recorded.

7. The system of claim 6, wherein the information associated with the selected one or more web pages is recorded if the risk factor is greater than a threshold.

8. The system of claim 1, further comprising:
a monitoring component that monitors a plurality of web page browsed by a user;
a fingerprint computing component that calculates the fingerprint of each of the browsed web page;
a comparison component that calculates if the similarity between the browsed page and the one or more web pages is greater than a determined threshold to determine if the browsed web page is a spoof; and
an output component that triggers an alarm if the browsed web page is determined to be a spoof.

9. The system of claim 8, wherein the comparison component compares at least one of a URL (Uniform Resource Locator), name or IP (Internet Protocol) address of the browsed web page and a disparate web page wherein the similarity between the browsed page and the disparate web page is greater than the determined threshold.

10. The system of claim 9, wherein the comparison component further determines that the browsed page is spoofed if the at least one of a URL (Uniform Resource Locator), name or IP (Internet Protocol) address of the browsed page and the web page are different.

11. The system of claim 10, wherein the comparison component further determines that the browsed page is legitimate if the at least one of a URL (Uniform Resource Locator), name or IP (Internet Protocol) address of the browsed page and the disparate web page are the same.

12. The system of claim 8, wherein the comparison component determines the browsed page is legitimate if the similarity between the browsed page and the one or more web pages is less than the determined threshold.

13. The system of claim 8, wherein the output component denies access to he browsed page if the browsed page is determined to be spoofed.

14. A method of detecting content spoofing, comprising:
determining a set of one or more web pages to be recorded, the set of one or more web pages specified by a user as legitimate web pages to be protected and selected based on a frequency of the user accessing sensitive information related to the user from the one or more web pages;
recording information associated with the set of one or more web pages, the information including at least a fingerprint of the set of one or more web pages;
monitoring a web page browsed by a user;
generating information associated with the browsed web page, the information including at least a fingerprint of the browsed web page, the fingerprint of the browsed web page computed based on a content of the browsed web page; and
comparing the information associated with the browsed web page to that of the set of one or more web pages to determine if the browsed web page is spoofed.

15. The method of claim 14, further comprising determining the set of one or more web pages by at least one of a user input, a pre-learned database or dynamically determining one or more web pages based on calculation of a risk factor.

16. The method of claim 14, further comprising automatically determining the set of one or more web pages to be recorded by employing an artificial intelligence based scheme.

17. The method of claim 14, further comprising:
determining similarity between the browsed web page and each of the set of one or more web pages;

determining a query web page from the set of one or more web pages that is similar to the browsed web page greater than a threshold;

comparing at least one of the URL (Uniform Resource Locator), name or IP (Internet Protocol) address of the browsed page with the query page; and determining if the browsed page is spoofed based on the comparison.

18. A system that dynamically detects content spoofing, comprising:

means for determining a set of one or more web pages to be recorded, the set of one or more web pages specified by a user as legitimate web pages to be protected and selected based on a frequency of the user accessing sensitive information related to the user from the one or more web pages;

means for recording information associated with the set of one or more web pages, the information including at least a fingerprint of each of the set of one or more web pages;

means for dynamically generating information associated with a web page browsed by a user, the information including at least a fingerprint of the browsed web page, the fingerprint of the browsed web page computed based on a content of the browsed web page;

means for comparing the information associated with the browsed web page to that of the set of one or more web pages; and means for determining if the browsed webpage is spoofed based on the comparison.

19. The system of claim 18, further comprising:

means for automatically determining the set of one or more web pages to be recorded based on an analysis of web pages browsed by a user.

20. The system of claim 18, further comprising:

means for comparing at least one of a URL (Uniform Resource Locator), name or IP (Internet Protocol) address of the browsed page and a query page from the set of one or more web pages, the query page is similar to the browsed webpage by a value greater than a threshold;

means for determining if the browsed page is spoofed if the at least one of a URL (Uniform Resource Locator), name or IP (Internet Protocol) address of the browsed page and the query page are not the same; and means for at least one of, denying access to the browsed page, or triggering an alarm, if the browsed page is spoofed.

* * * * *

UNITED STATES PATENT AND TRADEMARK OFFICE
CERTIFICATE OF CORRECTION

PATENT NO. : 8,205,255 B2  Page 1 of 1
APPLICATION NO. : 11/748314
DATED : June 19, 2012
INVENTOR(S) : Benea et al.

It is certified that error appears in the above-identified patent and that said Letters Patent is hereby corrected as shown below:

In column 14, line 37, in Claim 13, delete "he" and insert --the--, therefor

In column 14, line 43, in Claim 14, delete "frequencv" and insert --frequency--, therefor Signed and Sealed this
Eleventh Day of September, 2012

David J. Kappos
*Director of the United States Patent and Trademark Office*